Jan. 14, 1964     A. W. McCOY ETAL     3,117,418
HIGH PRESSURE FLUID EJECTOR FOR ENGINE STARTING TURBINES
Filed Nov. 21, 1960
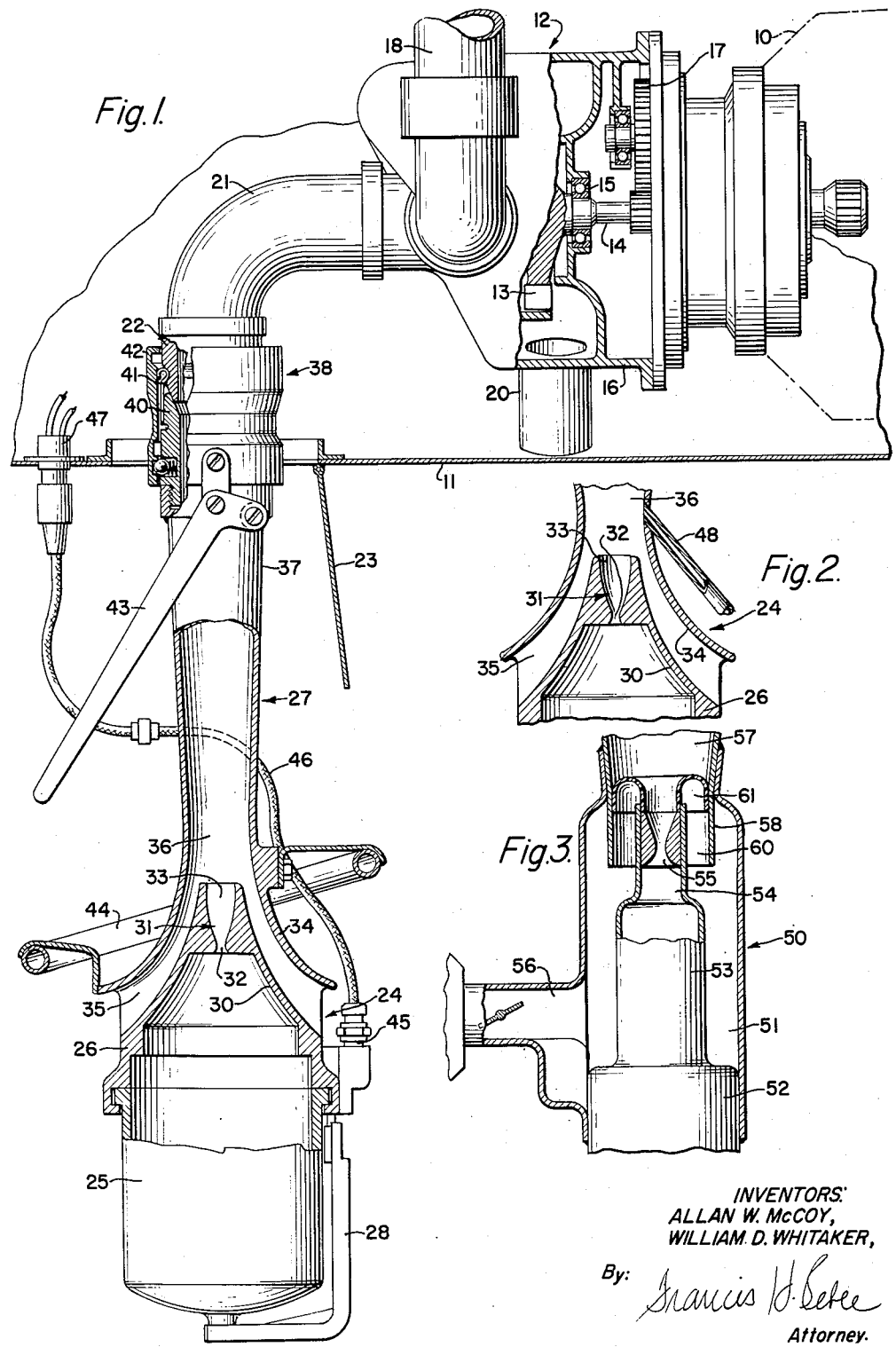
INVENTORS:
ALLAN W. McCOY,
WILLIAM D. WHITAKER,
By: *Francis H. Debee*
Attorney.

United States Patent Office 3,117,418
Patented Jan. 14, 1964

3,117,418
HIGH PRESSURE FLUID EJECTOR FOR ENGINE
STARTING TURBINES
Allan W. McCoy, Scottsdale, Ariz., and William D.
Whitaker, Long Beach, Calif., assignors to The Garrett
Corporation, Los Angeles, Calif., a corporation of
California
Filed Nov. 21, 1960, Ser. No. 70,905
8 Claims. (Cl. 60—39.14)

This invention relates to starters for turbine engines and aims to provide an improved fluid pressure generator means utilizing a solid fuel or propellant both for starting and emergency operation of turbine engines.

Gas turbine engines are frequently started with an apparatus of the turbine type employing compressed air or similar pressurized gases as motive fluids. Oftentimes the fluid pressure required for the starter is supplied either from a gas turbine at some other location or a previously started main turbine engine. More recently, cartridges containing a solid, ignitible fuel have been used as a source for generating high-pressure, high-temperature gases for turning the starter turbine; however, there are problems in the use of such cartridges. For example, the high pressure and temperature of the gases may cause erosion and cracking of the conduits, housing and moving turbine parts, thus necessitating heavier design of such parts. In addition, the most effective cartridges produce temperatures and pressures that may cause the turbine which they are supplying to reach dangerously high speeds. Because of this, special safety devices and brakes for the turbine have been required.

According to the present invention, these and other difficulties are obviated by the provision of a novel mechanism utilizing a solid fuel cartridge in combination with a special ejector nozzle having means for achieving a secondary fluid flow for reducing the temperature and pressure of the starting gas produced by the cartridge and increasing the volume of fluid available for use by the starter turbine.

It is an object of this invention to provide an improved gas generator mechanism for starting gas turbine engines which mechanism is adapted to use high-temperature and high-pressure cartridge gas and includes means for eliminating the damaging properties of such gases.

Another object is to provide such a gas generator which includes an ejector nozzle that is constructed and arranged to achieve a secondary fluid flow when a high energy primary flow is available, such secondary flow acting to increase the volume and lower the velocity of the primary flow.

A further object of this invention is to provide a novel ejector for use with solid propellant fuel cartridges in starting gas turbine engines, which ejector includes a nozzle for accelerating the primary flow of gases from the cartridge, means for introducing a secondary source of fluid to the primary flow, a section for mixing the primary and secondary fluid streams, and a diffuser for reducing the velocity of the mixed gases.

The above and other objects and advantages of this invention will become apparent from the following description and the accompanying drawing, in which:

FIG. 1 is an elevational view, with portions broken away and in section, of a turbine starter utilizing a fuel cartridge and ejector embodying the principles of the present invention;

FIG. 2 is a fragmentary sectional view of a portion of the FIG. 1 apparatus showing a modification of the lower portion of the ejector; and FIG. 3 is a fragmentary sectional view of a modified form of construction similar to FIG. 1.

Referring now to FIG. 1, a gas turbine or other engine 10, which is to be started or driven, is shown mounted in a casing 11 and is provided with an air turbine starter motor 12. This air turbine starter, which may be of the single-stage, axial-flow, impulse type, has a wheel 13 mounted on a shaft 14 rotating in bearings 15 provided in a housing 16. Shaft 14 has its drive pinion connected through a suitable transmission gearing 17 with the gas turbine 10. Transmission 17 may be of any suitable type, that illustrated including planetary gears and a ring gear in driving connection through a pawl and ratchet clutch with the main turbine 10, the clutch disengaging the transmission when the engine starts and reaches a predetermined speed. Since the transmission per se forms no part of the present invention, no details thereof have been illustrated.

To effect the operation of the starter 12, air or other gas under pressure may be supplied to the turbine wheel 13 through an inlet pipe 18 and be discharged through an exhaust stack or pipe 20. Inlet 18 is formed for connection to a suitable source of bleed air, such as another gas turbine engine similar to turbine 10. Alternately, suitable fluid pressure for driving the turbine may be supplied through an inlet 21 which terminates away from the turbine in an inlet nipple or coupling section 22. Obviously, when the inlet 21 is used, inlet pipe 18 may be closed in any suitable manner, such as by a butterfly valve (not shown). If desired, inlet 21 may be protected when not in use by a suitable cover or access door 23. Operating fluid may also be supplied to the inlet 21 by a gas generator designated generally by the numeral 24 forming the subject matter of the present invention.

In the usual gas generating cartridge construction, the cartridge is provided with a reduced neck or ejector portion that may be directly connected to the inlet 21 through coupling section 22. Thus the hot gases, which often exceed 2000° F., generated by the fuel provided in the cartridge are ejected directly at high velocity into the inlet conduit 21 and then to the turbine wheel 13. Such hot gases are corrosive and erosive and usually contain quantities of solid particles which have a tendency to build up on the surfaces which they contact. As a result, it has been necessary in the past to design the parts which are contacted by the hot, high-pressure, corrosive gases so as to withstand such deleterious action of the gases.

According to the present invention, in the form shown in FIG. 1, the gas generator 24 comprises a container or breech 25 which may contain a solid propellant fuel which constitutes the fuel cartridge. The breech is removably attached to an inlet portion 26 of a jet pump or ejector 27 by lugs provided on said inlet and said breech is held in place by a combination handle and clamp 28. Immediately above the inlet 26 the walls of the ejector 27 slope inwardly at 30 and lead into a converging-diverging nozzle 31 having a reduced or restricted orifice 32 which opens into a conical or diverging outlet 33. Surrounding the inwardly sloping wall 30, an outer spaced wall 34 is provided and shaped to form an upwardly sloping and converging annular passage 35. This passage connects the ejector at its lower and wider portion to the ambient atmosphere and constitutes an annular secondary nozzle for introducing ambient air to the ejector, as will be explained more fully hereinafter. Both the annular secondary nozzle 35 and the primary nozzle 33 empty into a mixing section 36 of the ejector and this section in turn leads to a gradually enlarging or diverging diffuser section 37. The upper and outlet end of the enlarged diffuser is provided with a coupling device 38 which is designed to fit into proper sealed engagement with the coupling section or inlet nipple 22, thus connecting the diffuser section 37 of the ejector 27 with the inlet 21.

As indicated in the drawing, the coupling device 38 includes a terminal section 40 that is shaped to fit into fluid tight engagement with the coupling section 22 and carries a locking spring or detent 41. A collar 42 is slidably mounted over the terminal section 40 and adapted to be moved into a closed position by a pivotally mounted toggle lever 43 so as to hold the detent 41 and the entire ejector in its locked operative position. For ease in positioning the gas generator 24 for a starting operation, it may be provided with a handle 44 attached to the ejector 27 in any convenient place above the breech 25. Ignition of the fuel in the breech 25 may be effected by an ignition device, such as a hot wire or spark plug 45, attached to the inlet 26 and arranged to receive electric current through a conductor 46 leading to a receptacle 47 attached to the casing 11. This receptacle is of conventional construction and may be connected to a suitable source of electric current (not shown). If it should be desired to ignite the fuel in the breech 25 at the bottom thereof rather than the side, the conductor 46 may be led to the bottom of the breech through the handle 28.

In operation, the gas generator assembly, charged with a suitable solid propellant fuel in the breech 25, is lifted into position by the handle 44, and the coupling section 22 is inserted into the collar 42. This brings the terminal section 40 into tight contact with the coupling section 22 and the detent 41 will snap into locked position. Then a lifting movement of the lever 43 will cause the collar 42 to slide upward into locked position. Conductor 46 is then connected to the receptacle 47 so that when current is supplied to the spark plug 45 the fuel in the breech 25 will be ignited. The fuel is a solid propellant which when ignited gives off gas that builds up in pressure and temperature in the inlet end 26 of the ejector. Such pressure then forces the gas at supersonic velocity through the converging-diverging nozzle 31, where its velocity increases as it passes into the mixing section 36. This action of the pressurized gas and the design of the annular passage 35 create a zone of reduced pressure in the upper portion of said annular passage, so that ambient air will be drawn therethrough into the mixing chamber 36 to mix with the gas from the breech 25.

It will be apparent that the air flowing through the annular passage 35 will cool the lower portion of the ejector, around the nozzle 31 and adjacent to the sloping wall 30, and will also mix with the high-temperature gas in the mixing chamber. This will increase the volume of gas and reduce both the temperature and velocity of the gas in said mixing chamber 36. The thus mixed gas then moves upwardly through the diffuser section 37 where its velocity and temperature are further lowered as it passes into the inlet conduit 21 and thence to the turbine wheel 13. The diffuser is also designed to increase the static pressure of the gas. By proper design of the annular nozzle 35, the mixing chamber 36, and the diffuser section 37, the pressure and temperature of the gases to be used in turning the turbine may be adjusted to a point where erosion and heat damage of the inlet and turbine parts are reduced to a minimum or eliminated. In fact, the gas generator or combination cartridge and ejector embodying the principles of this invention can be constructed and arranged to provide starting fluid pressure with substantially the same characteristics as that from another turbine, so that little, if any, change in the starter turbine design will be required.

If desired, the volume of gas in the ejector may be further increased and the temperature further reduced by the injection of water or water vapor into the fluid stream immediately above the nozzle 31, as shown in FIG. 2. At this point the static pressure in the ejector is below ambient pressure so that a conduit or tube 48 inserted in the ejector wall and opening into the ejector will be subjected to such reduced pressure. In the present instance, the conduit 48 is connected to a source of water (not shown) and water will be drawn upward from the supply source and entrained in the hot fluid stream. Thus, the fluid stream passing upward into the diffuser section of the ejector includes gas from the fuel cartridge, ambient air drawn in through the passage 35, and water from the conduit 48. Either the passage 35 or conduit 48, or both of them, constitutes means for increasing the volume of gases in the mixing section of the ejector.

In FIG. 3, there is shown a slightly modified form of construction embodying the features of this invention, wherein a fluid pressure generator 50 is constructed with a lower chamber 51 for receiving a fuel cartridge or breech 52. Immediately above the cartridge 52 a cylindrical receiver or chamber 53 is formed or arranged in operative engagement with the breech 52. This cylindrical chamber has a reduced portion 54 at its upper end which leads to a restricted nozzle 55 similar to the nozzle 31. Chamber 51 surrounds the cylindrical receiver 53 so as to form an annular cooling receptacle into which a cooling fluid, such as water or water vapor, may be led through a conduit 56. Water may be supplied, under the control of a valve, to the conduit 56 from a source (not shown) which may be suitably pressurized so that the water will be forced into the lower chamber 51. Nozzle 55 empties into a mixing chamber 57 similar to the mixing section 36 but provided with a downwardly extending sleeve 58 which surrounds nozzle 55 so as to form an annular secondary nozzle or passage 60 similar in function to the secondary nozzle 35 in FIG. 1.

Thus, as fuel in the breech 52 is ignited and the generated gas moves into the cylindrical receiver 53, the temperature of the receiver and the gas included therein are reduced by the cooling liquid supplied through conduit 56. Such cooling liquid will collect in the chamber 51, and, as the gas from the cartridge passes from the nozzle 55 into the mixing chamber 57, will be inducted or drawn through the secondary nozzle 60 to mix with the cartridge gases in the mixing chamber 57. If desired, an annular gasket or protective seal 61 may be provided over the outlet of the nozzle 55 so as to close the secondary nozzle 60. This annular protective seal is preferably thermally responsive or temperature sensitive and therefore constructed of a material which will break or fuse at a predetermined temperature and pressure. In this way the cooling fluid may be kept in the chamber 51 until the predetermined temperature and pressure are reached when it will be drawn into the mixing chamber 57. From the mixing chamber 57 upward, the FIG. 3 construction of the ejector is the same as that shown in FIG. 1, so that the mixed fluids pass into a diffuser section for further reduction of velocity and increase in static pressure, and finally into the turbine inlet.

It will be understood that in all forms of construction shown and described, the ejector includes a mixing section and a diffusing section; and that together these two sections, above the nozzle 31 or 55, provide sufficient length in the ejector to reduce or eliminate the erosive action of the gas from the cartridge. Furthermore, the length and design of the ejector are such that as the gases emerge therefrom and pass into the turbine inlet, they will have substantially the same energy characteristics as starting gases or fluids supplied from another turbine or conventional source. Thus, the need for redesign of the turbine in order to use a cartridge starter is substantially eliminated.

From the foregoing description it will be apparent that the present invention provides an improved gas generating mechanism which may be used universally in gas turbine applications having a connection for supplying fluid pressure to the starting turbine and very little, if any, modification of the turbine or inlet conduits will be required. While the features of the invention have been shown in conjunction with a solid fuel cartridge, it will be understood that the ejector could be used with bottled gas or any other source of high pressure gas. Various changes may be made in the construction and certain features may be employed without others without departing from the invention or sacrificing any of its advantages.

We claim:

1. In a fluid pressure operated turbine starter for an aircraft engine of the type enclosed in a casing, the starter being secured to the engine and having an inlet for fluid under pressure and an exhaust outlet leading to the exterior of the engine casing, an auxiliary fluid pressure source comprising: a second inlet means mounted on the starter and communicating at one end with the first-mentioned inlet, the other end terminating in a coupling section adjacent an opening in the engine casing; a unit adapted to be attached to, supported by, and detached from said second inlet means, said unit having a cartridge receiving breech; an ejector means formed for attachment to and removal from said breech, said ejector having a converging-diverging nozzle communicating with said breech and a diverging mixing tube with an outwardly flared inlet end surrounding said nozzle and opening to the atmosphere; and a complemental coupling section at the outlet end of said mixing tube for connection with the coupling section on said second inlet means.

2. A manually manipulated gas supply probe for detachable connection with an air turbine engine starter having an inlet fitting comprising: a straight tubular element with a flared inlet end and an outlet end adapted for gas-tight connection with and support by the starter inlet fitting; clamp means adjacent the outlet end of said element for securing the element on said inlet fitting, said clamp means having detent means and sleeve means slidable on said element to activate and inactivate said clamp means; lever means on said element adjacent said inlet end and operative to actuate said sleeve means; supporting handle means mounted on said element adjacent said inlet end; a primary gas nozzle with a converging-diverging outlet supported in the inlet end of said element and spaced from the flared portion thereof to provide an ambient air inlet; and a cartridge receiving breech removably attached to said primary gas nozzle to cause gas generated by the cartridge to flow from said primary gas nozzle at supersonic velocity.

3. A manually manipulated gas supply probe for detachable connection with an air turbine engine starter having an inlet fitting comprising: a straight tubular element with a flared inlet end and an outlet end adapted for gas-tight connection with and support by the starter inlet fitting; clamp means adjacent the outlet end of said element for securing the element to said inlet fitting; lever means for actuating said clamp means; handle means mounted on said element adjacent said inlet end; a primary gas nozzle with a converging-diverging outlet supported in the inlet end of said element and spaced from the flared portion thereof to provide an ambient air inlet; and a cartridge receiving breech removably attached to said primary gas nozzle to cause gas generated by the cartridge to flow from said primary gas nozzle at supersonic velocity.

4. A manually manipulated gas supply probe for detachable connection with an air turbine engine starter having an inlet fitting comprising: a straight tubular element with a flared inlet end and an outlet end adapted for gas-tight connection with and support by the starter inlet fitting, the portion of said element between the smaller part of the flared inlet and said outlet diverging; clamp means adjacent the outlet end of said element for securing the element to said inlet fitting; means connected with and manually operated to activate and inactivate said clamp means; handle means carried by said element adjacent said inlet end; a primary gas nozzle with a converging-diverging outlet disposed in the flared inlet end of said element in spaced relation from the walls thereof to provide an ambient air inlet; and a cartridge receiving breech removably attached to said primary gas nozzle to cause gas generated by the cartridge to flow from said primary gas nozzle at supersonic velocity.

5. A manually manipulated gas supply probe for detachable connection with an air turbine engine starter having an inlet fitting comprising: a tubular element with a flared inlet end, a diverging intermediate portion and an outlet end adapted for gas-tight connection with and support by the starter inlet fitting; means adjacent the outlet end of said element and manually operated to clamp the element to said inlet fitting; means on said element near the inlet end for handling the probe during attachment to and removal from said inlet fitting; a primary gas nozzle with a converging-diverging outlet disposed in the flared inlet end of said element in spaced relation from the walls thereof to provide an ambient air inlet; and a cartridge receiving breech removably attached to said primary gas nozzle to cause gas generated by the cartridge to flow from said primary gas nozzle at supersonic velocity.

6. A manually manipulated gas supply probe for detachable connection with an air turbine engine starter having an inlet fitting comprising: a tubular element with a flared inlet end, a diverging intermediate portion and an outlet end adapted for gas-tight connection with and support by the starter inlet fitting; means adjacent the outlet end of said element and manually operated to clamp the element to said inlet fitting; a primary gas nozzle with a converging-diverging outlet disposed axially in the flared inlet end of said element, said gas nozzle being disposed in spaced relation from the walls of the flared inlet to provide an inlet for gas modifying fluid; and a cartridge receiving breech removably attached to said primary gas nozzle to cause gas generated by the cartridge to flow from said primary gas nozzle at supersonic velocity.

7. A manually manipulated gas supply probe for detachable connection with an air turbine engine starter having an inlet fitting comprising: a tubular element with a flared inlet end, a diverging intermediate portion and an outlet end adapted for gas-tight connection with and support by the starter inlet fitting; means adjacent the outlet end of said element and manually operated to clamp the element to said inlet fitting; a primary gas nozzle with a converging-diverging outlet disposed axially in the flared inlet end of said element said gas nozzle being disposed in spaced relation from the walls of the flared inlet to provide an inlet for gas modifying fluid; temperature responsive means for closing said modifying fluid inlet until the temperature of the nozzle reaches a predetermined degree; and a cartridge receiving breech removably attached to said primary gas nozzle to cause gas generated by the cartridge to flow from said primary gas nozzle at supersonic velocity.

8. A manually manipulated gas supply device for detachable connection with an air turbine engine starter having an inlet fitting comprising: means forming a tubular element having a flared inlet, a divergent duct leading from the inlet and an outlet adapted for gas-tight connection with and support by the starter inlet fitting; means for preventing undesired separation of said element from the starter inlet fitting; a gas jet nozzle supported axially in said flared inlet with the outer walls of the nozzle spaced from the flared walls of the inlet to provide an ambient air inlet; and high pressure gas supply means removably connected with said gas jet nozzle to supply gas thereto, such gas issuing from the nozzle at a rate and pattern as to induce air flow into said ambient air inlet.

References Cited in the file of this patent

UNITED STATES PATENTS

| | | |
|---|---|---|
| 968,724 | Wilstam | Aug. 30, 1910 |
| 2,482,394 | Wyman | Sept. 20, 1949 |
| 2,517,822 | Anderson | Aug. 8, 1950 |
| 2,620,627 | Nardone | Dec. 9, 1952 |
| 2,749,023 | Lewis | June 5, 1956 |
| 2,814,179 | Edelman | Nov. 26, 1957 |
| 2,842,937 | Clark | July 15, 1958 |
| 2,938,658 | Foster | May 31, 1960 |
| 2,960,824 | Plummer | Nov. 22, 1960 |
| 2,971,334 | Carlson | Feb. 14, 1961 |
| 2,988,882 | Hollings | June 20, 1961 |
| 2,994,194 | Volk | Aug. 1, 1961 |

FOREIGN PATENTS

| | | |
|---|---|---|
| 20,205 | Great Britain | July 6, 1911 |
| 366,181 | Great Britain | Feb. 4, 1932 |
| 551,643 | Great Britain | Mar. 4, 1943 |
| 839,925 | Great Britain | June 29, 1960 |